United States Patent
Irie et al.

(10) Patent No.: US 9,875,425 B2
(45) Date of Patent: Jan. 23, 2018

(54) INDIVIDUAL IDENTIFICATION DEVICE, AND IDENTIFICATION THRESHOLD SETTING METHOD

(71) Applicant: OMRON Corporation, Kyoto-shi, Kyoto (JP)

(72) Inventors: Atsushi Irie, Nara (JP); Kenji Fukuda, Shiga (JP)

(73) Assignee: OMRON Corporation, Kyoto (JP)

( * ) Notice: Subject to any disclaimer, the term of this patent is extended or adjusted under 35 U.S.C. 154(b) by 84 days.

(21) Appl. No.: 14/928,086

(22) Filed: Oct. 30, 2015

(65) Prior Publication Data
US 2016/0292536 A1    Oct. 6, 2016

(30) Foreign Application Priority Data

Mar. 30, 2015    (JP) .................................. 2015-069525

(51) Int. Cl.
G06K 9/62    (2006.01)
G06K 9/00    (2006.01)
G06F 21/32    (2013.01)

(52) U.S. Cl.
CPC .......... *G06K 9/6215* (2013.01); *G06F 21/32* (2013.01); *G06K 9/00288* (2013.01); *G06K 9/00892* (2013.01)

(58) Field of Classification Search
CPC .............. G06K 9/00288; G06K 9/6215; G06K 9/00892; G06F 21/32
See application file for complete search history.

(56) References Cited

U.S. PATENT DOCUMENTS

| 6,256,737 B1 * | 7/2001 | Bianco ............. G06F 21/32 |
| | | 713/186 |
| 7,689,833 B2 * | 3/2010 | Lange ................ A61B 5/04525 |
| | | 382/115 |

(Continued)

FOREIGN PATENT DOCUMENTS

| EP | 2 667 329 A1 | 11/2013 |
| JP | 2004046697 A | 2/2004 |

(Continued)

OTHER PUBLICATIONS

Office Action in counterpart Korean Patent Application No. 10-2015-0144425 dated Oct. 21, 2016 (17 page).

(Continued)

*Primary Examiner* — Sean Conner
*Assistant Examiner* — Pinalben Patel
(74) *Attorney, Agent, or Firm* — Osha Liang LLP (57) ABSTRACT

Provided is an individual identification device including: a biometric information storage unit; a biometric information acquisition unit; an identification unit which calculates a similarity of the biometric information on the subject and the registrant and performs identification of the subject according to whether or not the calculated similarity is equal to or higher than an identification threshold; an identification result storage unit which stores identification result information constituted by the calculated similarity and a correct identification result; and a threshold setting unit which sets the identification threshold such that at least either one of a false rejection rate and a false acceptance rate fulfils a predetermined condition in the identification result information stored in the identification result storage unit.

17 Claims, 6 Drawing Sheets

(56) References Cited

U.S. PATENT DOCUMENTS

| | | | |
|---|---|---|---|
| 7,856,122 B2 * | 12/2010 | Enomoto | G06K 9/00288 382/115 |
| 8,275,175 B2 * | 9/2012 | Baltatu | G06K 9/6284 382/118 |
| 9,189,680 B2 * | 11/2015 | Komatsu | G06K 9/00288 |
| 2002/0112177 A1 * | 8/2002 | Voltmer | G06F 21/32 726/26 |
| 2002/0174344 A1 * | 11/2002 | Ting | G06F 21/32 713/185 |
| 2003/0215114 A1 * | 11/2003 | Kyle | G06F 21/32 382/115 |
| 2004/0219902 A1 * | 11/2004 | Lee | G06F 21/36 455/410 |
| 2006/0224900 A1 * | 10/2006 | Watanabe | G06F 21/32 713/186 |
| 2007/0150745 A1 * | 6/2007 | Peirce | G06F 21/32 713/186 |
| 2008/0101658 A1 * | 5/2008 | Ahern | G06F 21/32 382/115 |
| 2008/0168534 A1 * | 7/2008 | Takamizawa | G06F 21/32 726/2 |
| 2008/0195387 A1 * | 8/2008 | Zigel | G10L 17/06 704/236 |
| 2009/0037978 A1 * | 2/2009 | Luque | G06F 21/32 726/2 |
| 2009/0310828 A1 * | 12/2009 | Kakadiaris | G06K 9/00208 382/118 |
| 2010/0148922 A1 * | 6/2010 | Yamada | G06F 21/32 340/5.82 |
| 2010/0162386 A1 * | 6/2010 | Li | G06F 21/32 726/19 |
| 2010/0306550 A1 * | 12/2010 | Kevenaar | G06F 21/32 713/186 |
| 2011/0013812 A1 | 1/2011 | Shin et al. | |
| 2012/0300988 A1 * | 11/2012 | Ivanov | G06K 9/00006 382/115 |
| 2013/0036459 A1 * | 2/2013 | Liberman | H04L 9/0866 726/6 |
| 2013/0212655 A1 * | 8/2013 | Hoyos | G06K 9/00107 726/5 |
| 2013/0215116 A1 * | 8/2013 | Siddique | G06Q 30/0643 345/420 |
| 2013/0283372 A1 | 10/2013 | Tsukamoto et al. | |
| 2013/0326229 A1 * | 12/2013 | Eguchi | H04L 9/3231 713/186 |
| 2013/0340061 A1 * | 12/2013 | Tsukamoto | G06F 21/32 726/7 |
| 2015/0161370 A1 * | 6/2015 | North | G07C 9/00158 726/5 |
| 2016/0147987 A1 * | 5/2016 | Jang | G06F 21/32 726/19 |
| 2016/0292494 A1 * | 10/2016 | Ganong | G06K 9/00288 |
| 2017/0011200 A1 * | 1/2017 | Arshad | G06F 19/3456 |

FOREIGN PATENT DOCUMENTS

| | | |
|---|---|---|
| JP | 2008117271 A | 5/2008 |
| KR | 2007-0099775 A | 10/2007 |
| KR | 2011-0007455 A | 1/2011 |

OTHER PUBLICATIONS

Extended European Search Report in counterpart European Application No. 15 19 0786.2 dated Aug. 4, 2016 (8 pages).

* cited by examiner

INDIVIDUAL IDENTIFICATION DEVICE, AND IDENTIFICATION THRESHOLD SETTING METHOD

BACKGROUND OF THE INVENTION

Field of the Invention

This application claims priority to Japanese Patent Application No. 2015-069525 filed on Mar. 30, 2015, the entire contents of which are incorporated by reference herein.

The present invention relates to an individual identification technique using biometric information, and more particularly to setting an identification threshold in individual identification using biometric information.

Description of the Related Art

Individual identification devices (individual authentication devices) have been heretofore used to determine whether or not an identification subject is a registrant by using biometric information such as a face, fingerprint, palm print, iris, or voice print. An individual identification device usually calculates a similarity between the biometric information on an identification subject and biometric information on a registrant, determines that the subject is the registrant when the similarity is equal to or higher than an identification threshold, and determines that the subject is not a registrant when the similarity is below the identification threshold.

In this case, where a large identification threshold is set, a false acceptance rate (FAR) of determining that a person who is not the registrant is the registrant can be suppressed, but a false rejection rate (FRR) of determining that the registrant is not the registrant increases. Conversely, where a small identification threshold is set, the false rejection rate can be suppressed, but the false acceptance rate increases. Therefore, determining adequately the identification threshold is important in terms of performing adequate biometric authentication.

Japanese Patent Application Publication No. 2004-46697 discloses a method in which biometric information on a non-registrant is also prepared in addition to biometric information on a registrant, the similarity of a subject and the non-registrant is calculated in addition to the similarity of the subject and the registrant, matching is performed, and an identification threshold is determined using the identification result. Where biometric information on a non-registrant is thus used, the sample number is increased and the identification threshold is determined from a large number of samples. Therefore, the identification threshold obtained is more suitable than that determined on the basis of identification result relating only to the registrant.

Further, Japanese Patent Application Publication No. 2008-117271 discloses a face recognition device in which where the capture position or timing of a face image of a recognition subject is close to the capture position or timing of the face image subjected to recognition processing, a threshold is lowered. Otherwise, the threshold is raised. In Japanese Patent Application Publication No. 2008-117271, when the capture positions or timings of face image are close, it is highly probable that an individual included in the face image is the same. Therefore, accurate recognition can be performed even when a low similarity is calculated due to the face orientation or illumination conditions.

CITATION LIST

Patent Literature

Patent Literature 1: Japanese Patent Application Publication No. 2004-46697

Patent Literature 2: Japanese Patent Application Publication No. 2008-117271

SUMMARY OF THE INVENTION

In Patent Application Publication No. 2004-46697, the conditions at the time the biometric information is acquired are not taken into account, and the false rejection rate or false acceptance rate, which rises when a high or low similarity is calculated due to the conditions, is difficult to suppress. Further, in Japanese Patent Application Publication No. 2008-117271, the threshold is lowered when the capture positions or timings are close, but biometric information acquired at close locations or timings can still relate to different individuals, and false acceptance can occur in such cases. Conversely, biometric information acquired at distant locations or timings can still relate to the same individual, and false rejection can occur in such cases.

The present invention has been created with the foregoing in view, and it is an objective of the present invention to provide a technique for setting an adequate identification threshold in individual identification using biometric information.

In order to resolve the above-described problems, the present invention provides an individual identification device including: a biometric information storage unit adapted to store biometric information on a registrant; a biometric information acquisition unit adapted to acquire biometric information on a subject; an identification unit adapted to calculate a similarity of the biometric information on the subject and the biometric information on the registrant and perform identification of the subject according to whether or not the calculated similarity is equal to or higher than an identification threshold; an identification result storage unit adapted to store identification result information constituted by the similarity calculated by the identification unit and a correct identification result in the identification; and a threshold setting unit adapted to set the identification threshold such that at least either one of a false rejection rate and a false acceptance rate fulfils a predetermined condition in the identification result information stored in the identification result storage unit.

Any biometric information can be used in accordance with the present invention. For example, behavioral characteristics such as handwriting, key stroke, blinking, lip movement, and walking pattern may be used in addition to physical characteristics (static characteristics) such as face, fingerprint, palm print, iris, voice print, and blood vessels.

The correct authentication result, as referred to herein, is information indicating whether or not the subject is the registrant serving as a target (matching target) for similarity calculation. The correct authentication result may be acquired from a unit other than the identification unit or from the identification unit.

The identification threshold may be set by the threshold setting unit, for example, in the following manner. The identification threshold can be set such that the false rejection rate and false acceptance rate are substantially equal to each other, or such that the false rejection rate is equal to or less than a first threshold or that the false acceptance rate is equal to or less than a second threshold.

With the individual identification device, the identification threshold is set on the basis of the similarity calculated during identification performed in the past and the correct identification result. Therefore, it is possible to set an adequate identification threshold such that the false rejection rate and false acceptance rate satisfy a predetermined relationship.

Further, in the present invention, the threshold setting unit can set the identification threshold by using identification result information relating to a predetermined number of most recent identifications or identification performed in a most recent predetermined period. Further, the threshold setting unit can also set the identification threshold by assigning a weight which is larger for identification result information relating to most recently performed identification. In this case, the weighting factor may be determined on the basis of how many times the identification has been performed in the past, or on the basis of the interval of time between the identification performed in the past and the present time.

Thus, environmental changes and changes in the subject can be considered by determining the threshold while placing emphasis on the most recent identification results. For example, when the biometric information on the subject changes with the passage of time from the time of registration, the threshold can be set by placing emphasis on the most recent biometric information with consideration for those changes. Further, the conditions at which the biometric information such as illumination state is acquired influences the calculation of similarity, and it can be found that the biometric information acquisition conditions are similar for temporarily close events. Therefore, adequate threshold setting can be performed.

Further, in the present invention, the threshold setting unit can set the identification threshold each item the identification with the identification unit is performed. As a result, the threshold is updated each time the newest information is obtained, and an adequate value can be maintained.

Further, in accordance with the present invention, the threshold setting unit may set the identification threshold when the identification unit performs the identification a predetermined number of times after the previous identification threshold setting has been performed. In such a case, computational load can be reduced. The predetermined number may be any number equal to or greater than one and may be set, as appropriate, with consideration for computational load and accuracy of identification. It is preferred that the predetermined number of times be variable and determined to be smaller as a variation in a value of the similarity calculated by the identification unit becomes larger. It is particularly preferred that the predetermined number be reduced as the variation in the value of similarity that is recently calculated increases. The reason is that large variations in the calculated similarity apparently indicate that the photographing conditions or state of the identification subject are different from those at the time of registration and that the identification threshold which is presently set can be inadequate.

Further, in the present invention, the threshold setting unit preferably does not set the identification threshold until the number of pieces of the identification result information accumulated in the identification result storage unit becomes a third threshold or higher. Where the number of identification results is small, abnormal values produce a significant effect and an inadequate value can be set. Accordingly, adequate threshold setting can be performed when the identification threshold is not set (updated) until a certain number (third threshold) or more of identification results is obtained, and the identification threshold setting is performed after the sufficient number of identification results is obtained. The value of the third threshold is preferably such that the adequate identification threshold setting can be performed when the number of identification results is equal to or greater than that number. For example, the identification threshold can be set when the number of pieces of accumulated identification result information in which the identification subject is the registrant and the number of pieces of accumulated identification result information in which the identification subject is not the registrant become certain respective numbers (fourth threshold and fifth threshold, respectively) or higher. This is because a certain number of identification results is necessary for both the case when the identification subjects is the registrant and the case in which the identification subject is not the registrant so that both the false rejection rate and false acceptance rate satisfy certain conditions.

The correct identification result can be acquired from a unit other than the identification unit. For example, the individual identification device in accordance with the present invention is further provided with a second identification unit adapted to perform identification on the basis of information different from the information used by the identification unit, the identification is performed by the identification unit and the second identification unit, and where the results thereof are different, the identification result obtained by the second identification unit can be determined as the correct identification result. The second identification unit may perform individual identification on the basis of biometric information different from that used by the identification unit or may perform individual identification with information other than the biometric information, for example, with a password, individual identification number, or card key. The second identification unit may also receive a correct answer input from the subject. The correct identification result can be also acquired from the identification unit. In the case of a plurality of registrants, the identification unit can calculate a similarity of the biometric information of the subject and the plurality of registrants and obtain the correct identification result that the subject is not the registrant with respect to the registrants other than that for which the highest similarity is obtained.

In the present invention, when biometric information on a plurality of registrants is stored in the biometric information storage unit, the identification threshold may be set individually for each of the plurality of registrants or a common threshold may be set for all of the registrants. Where an identification threshold is set for each registrant, the identification threshold may be set on the basis of the similarity of the biometric information of each registrant and the subject and the correct identification result. Where a common identification threshold is set for all of the registrants, the identification threshold may be set on the basis of the similarity of the biometric information of all of the registrants and the subject and the correct identification result.

The present invention can be regarded as an individual identification device including at least some of the above-described units. The present invention can be also regarded as a method for setting an identification threshold in individual identification using biometric information. Furthermore, the present invention can be regarded as a computer program for executing on a computer the steps of the method, or as a computer-readable recording medium that non-temporarily stores the program. The present invention can be configured by combining the above-describes configurations and processing steps, provided that no technical contradiction is created thereby.

In accordance with the present invention, adequate identification threshold can be set in individual identification using biometric information.

DESCRIPTION OF THE EMBODIMENTS

The first embodiment of the present invention is a portable information terminal using face authentication for login authentication or lock release. In the face authentication, the authentication is determined to be a success or a failure on the basis of whether or not the similarity of the input face image and registered face image is equal to or higher than a threshold. In the present embodiment, the threshold is dynamically changed using the results of past authentications to perform adequate authentication.

Figure 1A:
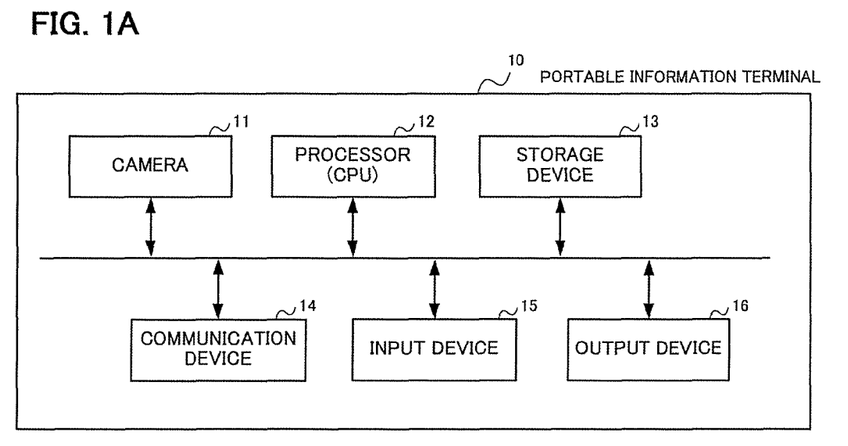
FIGS. 1A and 1B are a hardware configuration diagram and a functional block diagram of a portable information terminal performing face authentication according to the embodiment.

FIG. 1A illustrates the hardware configuration of a portable information terminal 10 according to the present embodiment. The portable information terminal 10 includes a camera 11, a processor 12, a storage device 13, a communication device 14, an input device 15, and an output device 16. The camera 11 may be incorporated in the portable information terminal 10 or attached thereto. The processor 12 is a general-use processor such as a central processing unit (CPU) and realizes the below-described functions by executing a program stored in the storage device 13. The storage device 13 includes a main storage device and an auxiliary storage device, stores the program to be executed by the processor 12, and stores image data or temporary data during program execution. The communication device 14 serves to perform communication of the portable information terminal 10 with an external computer. The communication may be performed via a wire or in a wireless manner by using any communication standard. The input device 15 is constituted by a button or a touch panel. The output device 16 is constituted by a display device or a speaker and used by the portable information terminal 10 to perform output to a user.

Figure 1B:
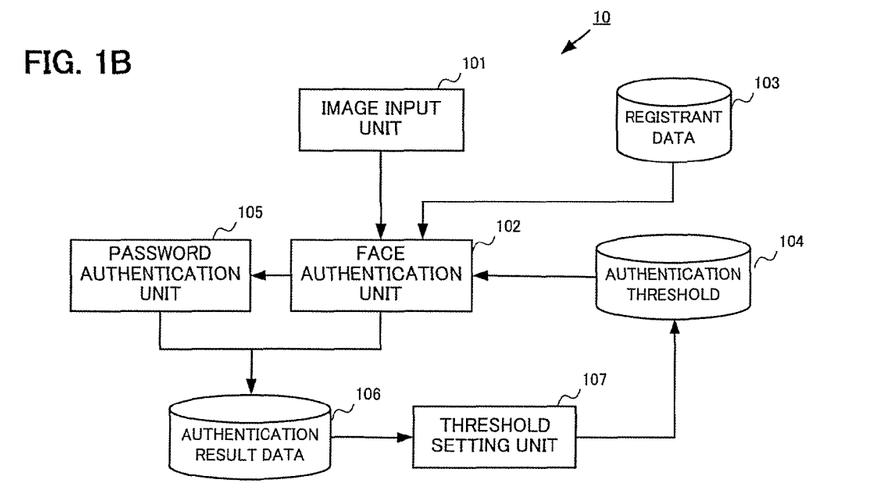

The processor 12 realizes the functions, such as depicted in FIG. 13, by executing a program. The processor 12 provides the functions of an image input unit 101, a face authentication unit 102, a registrant data storage unit 103, an authentication threshold storage unit 104, a password authentication unit 105, an authentication result data storage unit 106, and a threshold setting unit 107. The processing details of each of the units will be explained hereinbelow. Some or all of those functional units may be realized by dedicated hardware circuits.

The login processing in the portable information terminal 10 will be explained with reference to the flowchart depicted in FIG. 2. In this case, for the sake of simplicity, the case is explained in which the data on a registrant stored in the registrant data storage unit 103 relate only to one person and it is determined whether or not an authentication subject corresponds to the registrant. The processing performed in the case of a plurality of registrants is explained later.

In step S201, the face authentication unit 102 executes the face authentication processing. The detailed flowchart of the face authentication processing will be explained hereinbelow with reference to FIG. 3. Where a face image of a user (authentication object) is captured using the camera 11, the face authentication unit 102 acquires the captured face image through the image input unit 101 (S301). The face authentication unit 102 extracts feature quantities representing features of the face from the acquired face image (S302). For example, the face authentication unit 102 detects feature points such as end points of organs of the face, and extracts feature quantities such as a positional relationship of feature points or periodicity or orientation of a gray value in the vicinity of the feature points.

Figure 3:
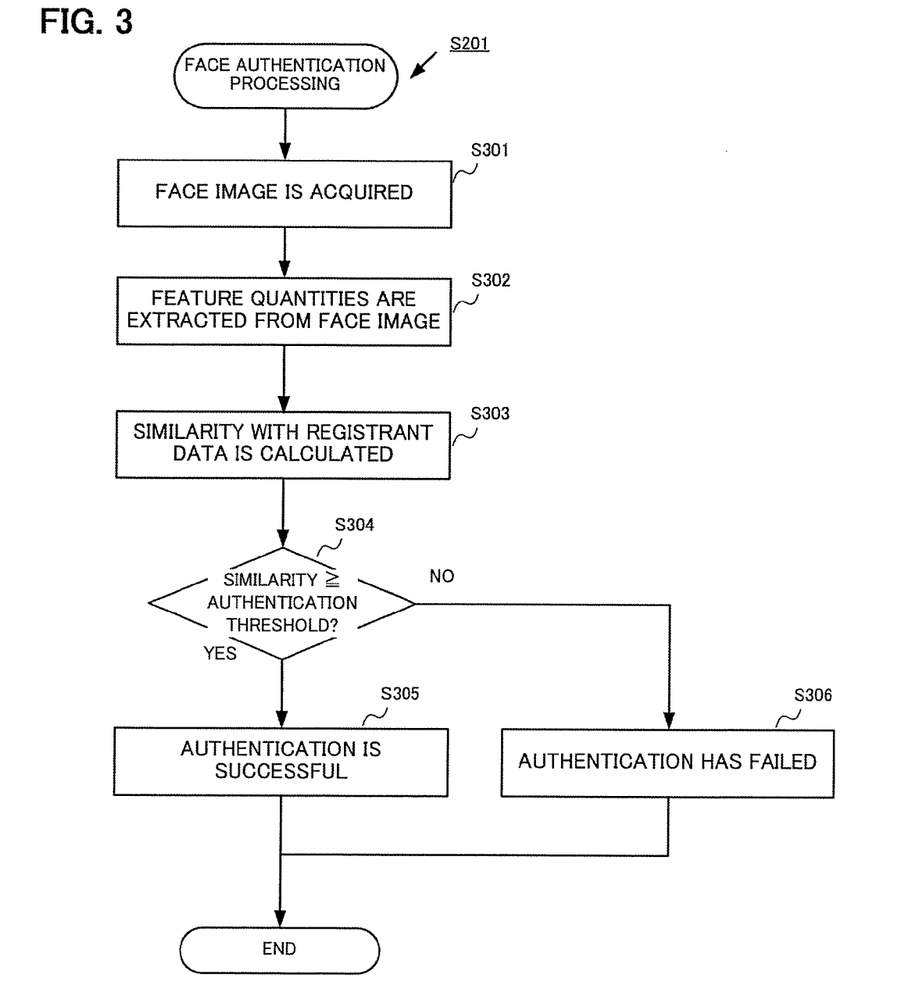
FIG. 3 is a flowchart illustrating the flow of face authentication processing in the embodiment.

The face authentication unit 102 calculates a similarity of the feature quantities acquired from the input image and the feature quantities of the registrant stored in the registrant data storage unit 103 (S303). In the registrant data storage unit 103, the feature quantities determined from the face image obtained by photographing the registrant's face have been stored in advance. The face authentication unit 102 matches the feature quantities acquired from the input image with the feature quantities of the registrant that have been stored in the registrant data storage unit 103 and calculates a score representing the similarity. In the present embodiment, the similarity is represented by a score from 0 to 1000, and a higher score corresponds to a higher similarity.

The face authentication unit 102 determines whether or not the similarity calculated in step S303 is equal to or greater than the authentication threshold stored in the authentication threshold storage unit 104 (S304). Where the similarity is equal to or greater than the authentication threshold (S304-YES), the authentication subject can be identified as the registrant, and the authentication processing using the face image is determined as successful (S305). Meanwhile, where the similarity is less than the authentication threshold (S304-NO), the authentication subject can be identified as not the registrant and it is determined that the authentication processing using the face image has failed (S306).

Figure 2:
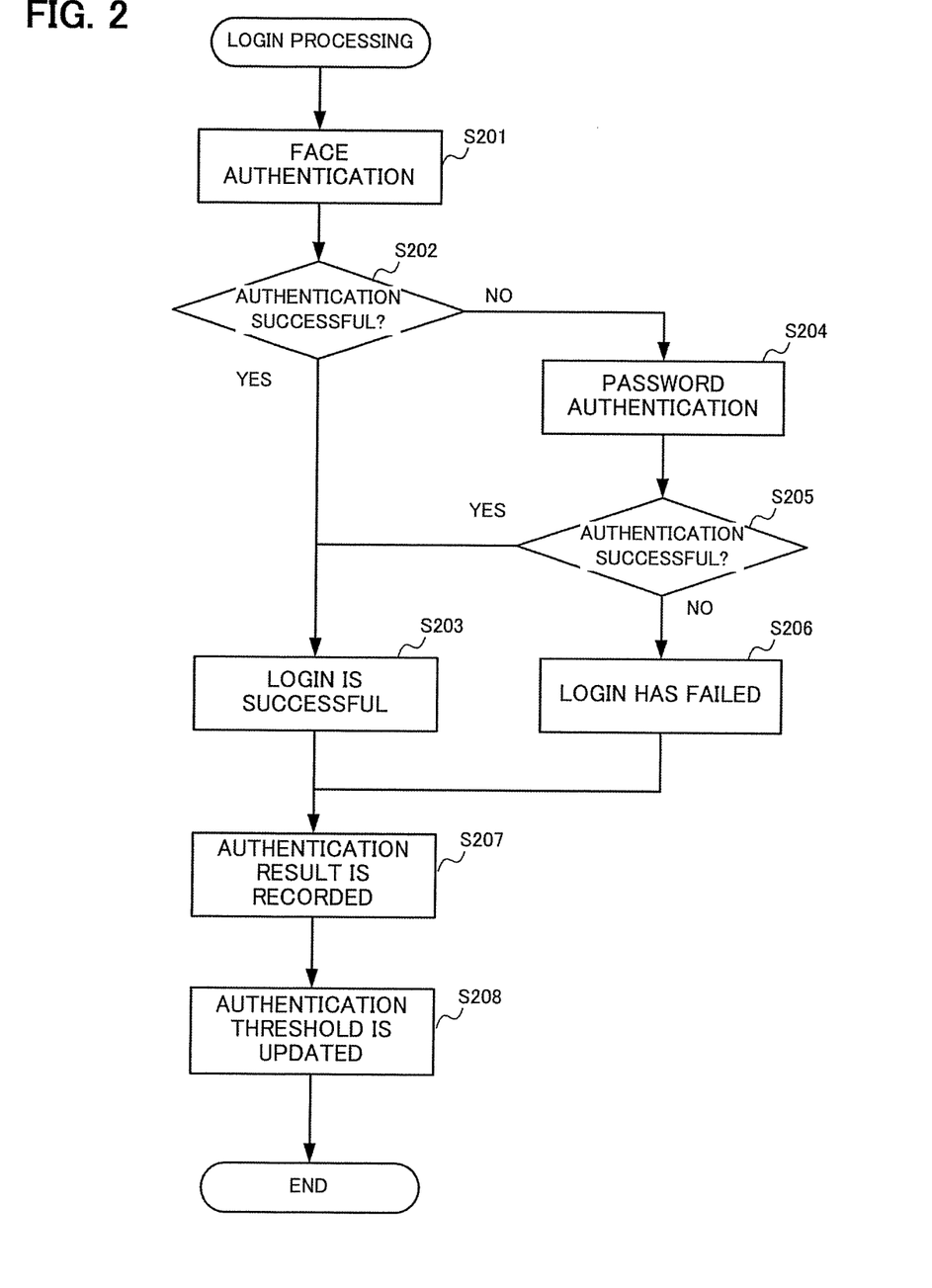
FIG. 2 is a flowchart illustrating the flow of login authentication processing in the embodiment.

Returning to the flowchart in FIG. 2, where the face authentication has been successful (S202-YES), it is determined that the login authentication has been successful (S203). Meanwhile, even when the face authentication has failed (S202-NO), the authentication subject still can be the registrant. For example, false rejection can occur when the illumination conditions, face orientation, and hairstyle at the time the face image was captured are different from those at the time the registrant data were captured, or when the camera was shaking when the face image was captured. Accordingly, when the face authentication has failed, the portable information terminal 10 performs authentication by a means other than the face authentication. In the present embodiment, the portable information terminal 10 performs authentication processing using a password (S204). The password authentication unit 105 performs the authentication by requesting the input of a password from the authentication subject and determining whether or not the input password matches the password that has been registered in advance. Where the authentication using the password is successful (S205-YES), it is determined that the authentication subject is the registrant and the login authentication has been successful (S203). Meanwhile, where the authentication using the password has failed (S205-NO), it is determined that the authentication subject is not the registrant and the login authentication has failed (S206). Any available authentication method such as authentication using a registered pattern (pattern lock), authentication using a card key (contactless IC card), and authentication using biometric information other than a face image can be used instead of the authentication using password.

Figure 4A:
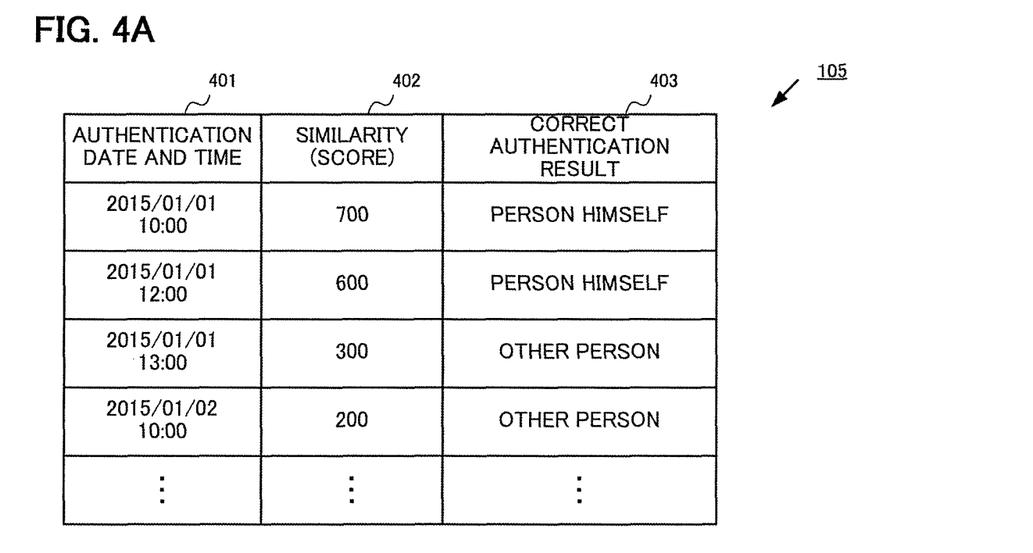
FIGS. 4A and 4B illustrate and example of authentication result data and the false rejection rate and false acceptance rate.

The portable information terminal 10 stores the authentication result obtained in the above-described authentication processing in the authentication result data storage unit 106 (S207). As depicted in FIG. 4A, the authentication result data stored in the authentication result data storage unit 106 include authentication day and time 401, a similarity 402, and a correct identification result 403. The authentication day and time are preferably the date and time at which the face image that has been used for the face authentication is captured. The similarity 402 is the similarity of the authentication subject and the registrant which is determined in step S303 of face authentication. The correct identification result 403 is information representing whether or not the authentication subject is the registrant (the registrant considered for comparison when the similarity is calculated). In the present embodiment, when either one of the face authentication and password authentication is successful, the authentication subject can be determined to be the registrant. Conversely, when both the face authentication and the password authentication have failed, it can be determined that the authentication subject is not the registrant. Further, when the authentication result data that have already been stored in the authentication result data storage unit 106 reach the upper limit when the results of the newly performed authentication are recorded, it is preferred that the oldest data be deleted.

When there is only one registrant, the false acceptance is difficult to detect. Accordingly, it is preferred that one or a plurality of dummy registrants be prepared and stored in the registrant data storage unit 103. Where the similarity of the feature quantities obtained from the input image and the feature quantities of the dummy registrant is less than the authentication threshold, other persons can be correctly rejected, and where the similarity is equal to or higher than the authentication threshold, false acceptance occurs. The portable information terminal 10 also stores in the authentication result data storage unit 106 the results of authentication with the dummy registrants which have thus been obtained. In this case, it is desirable that the similarity between the dummy registrants and the actual registrant be low. Therefore, the portable information terminal 10 does not use the above-described processing with respect to the dummy registrants for which the similarity with the actual registrant is equal to or higher than a predetermined value (may be the same as or different from the authentication threshold).

Figure 4B:
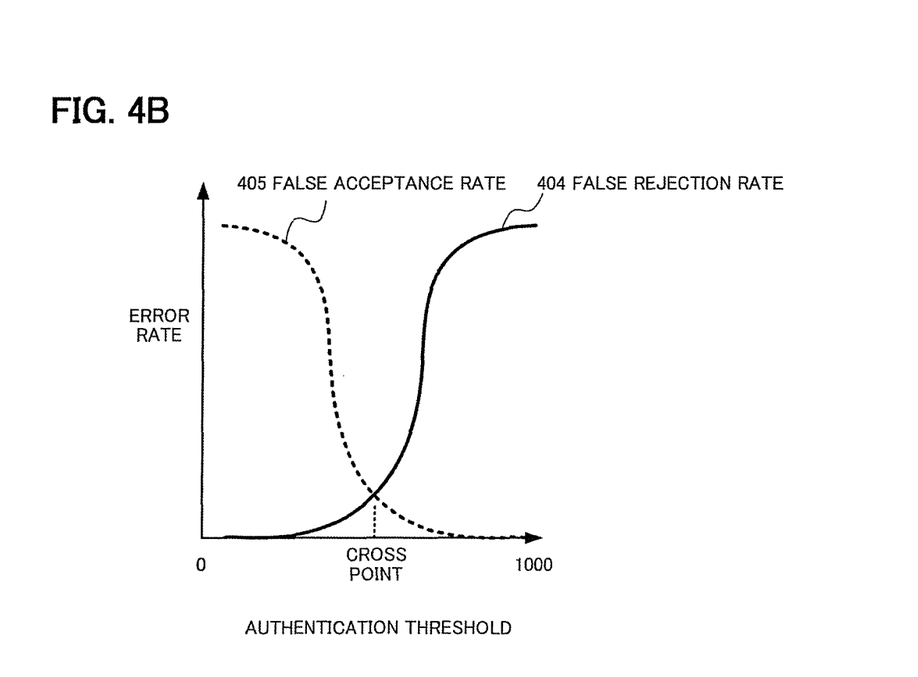

The threshold setting unit 107 update (sets) the authentication threshold on the basis of the authentication result data stored in the authentication result data storage unit 106 (S208). By using a plurality of authentication result data stored in the authentication result data storage unit 106, it is possible to calculate the false rejection rate or false acceptance rate when the authentication threshold has been changed. The false rejection rate is the probability that the authentication object, although being the registrant, is identified as not the registrant. The false acceptance rate is the probability that the authentication object, although being not the registrant (namely, being other person), is identified as the registrant. It is preferred that both the false rejection rate and the false acceptance rate be small. As depicted in FIG. 4B, where the threshold is reduced, a false rejection rate 404 can be reduced, but a false acceptance rate 405 rises. Conversely, where the threshold is increased, the false acceptance rate 405 can be reduced, but the false rejection rate 404 rises.

An adequate threshold for use is a threshold that makes the false acceptance rate and false rejection rate equal to each other (threshold in the cross point in FIG. 4B). In the present embodiment, the threshold setting unit 107 updates the authentication threshold such that the false acceptance rate and false rejection rate become equal to each other. In the present embodiment, the threshold setting unit 107 determines the false acceptance rate and false rejection rate, while changing the threshold, and retrieves the threshold at which the false acceptance rate and false rejection rate become equal to each other. Further, in the present embodiment, weighted false acceptance rate and false rejection rate are determined by providing a weight that is larger for more recent authentication results, and the threshold is determined such that the weighted false acceptance rate and false rejection rate become equal to each other.

The authentication threshold update processing will be explained hereinbelow in detail with reference to the flowchart depicted in FIG. 5. The threshold setting unit 107 acquires the authentication result data from the authentication result data storage unit 106 (S501). In the present embodiment, the authentication results of authentication processing of 100 most recent cycles are used. Therefore, the threshold setting unit 107 acquires the authentication result data of 100 most recent cycles. The threshold setting unit 107 also acquires the present authentication threshold from the authentication threshold storage unit 104 (S502).

The threshold setting unit 107 calculates the false rejection rate and false acceptance rate for the case in which the authentication threshold acquired in step S502 is used in the authentication result data acquired in step 5501 (S503). In this case, the false rejection rate and false acceptance rate are calculated using a weighting factor which is larger for the most recent recognition result. For example, in the authentication processing from the first preceding cycle to the tenth preceding cycle, data are multiplied by 2 (counted 2 times), and in the authentication processing from the eleventh preceding cycle to the twentieth preceding cycle, data are multiplied by 1.8 (counted 1.8 times). Thus, a larger weighting factor is assigned to the results of the most recent authentication processing, and a smaller weighting factor is assigned to the results of authentication that has been previously performed. In this case, the weighting factor is determined on the basis of the sequence number of the previous authentication cycle, but the weighting factor may be also determined on the basis of the difference between the timing at which the authentication has been performed and the present timing. The weighted false rejection rate can be calculated as a ratio of the weighted number of identification result data for which the similarity 402 is less than the authentication threshold to the weighted number of identification result data in which the correct identification result 403 is "PERSON HIMSELF". The weighted false acceptance rate can be calculated as a ratio of the weighted number of identification result data for which the similarity 402 is equal to or greater than the authentication threshold to the weighted number of identification result data in which the correct identification result 403 is "OTHER PERSON".

The threshold setting unit 107 determines whether the weighted false rejection rate and weighted false acceptance rate calculated in step S503 are equal to each other (S504). Where the two values are equal (S504-YES), it is determined that the present authentication threshold is adequate (S506). Meanwhile, where the two values are different (S504-NO), the threshold setting unit 107 changes the value of the authentication threshold. The threshold setting unit 107 lowers the authentication threshold when the weighted false rejection rate is higher than the weighted false acceptance rate and raises the authentication threshold when the weighted false rejection rate is lower than the weighted false acceptance rate. In this case, the variation amount of the authentication threshold may be a fixed value, but it is preferred that this amount correspond to the difference between the weighted false rejection rate and the weighted false acceptance rate. After the authentication threshold has been changed, the processing returns to step S503 and the processing same as that described hereinabove is repeated using the changed authentication threshold. As a result, the authentication threshold can be eventually determined such that the weighted false rejection rate and the weighted false acceptance rate become equal to each other. The threshold setting unit 107 stores the authentication threshold determined in step S506 in the authentication threshold storage unit 104.

The portable information terminal 10 according to the present embodiment can set adequately the authentication threshold during face authentication by performing the above-described functions. Where the usage environment is different, the similarity of the captured face image and registered face image changes. A high similarity is calculated when the image is captured under the same conditions as those during the registration, but a low similarity is calculated when the illumination conditions, face orientation, hairstyle or the like changes. In the present embodiment, the authentication threshold is determined from the similarity obtained from the face image that has been actually captured in the past and the correct result at that time. Therefore, the adequate authentication threshold can be set such that the false rejection rate and the false acceptance rate become equal to each other. Further, since the authentication threshold is set by placing more emphasis on the results relating to the most recent authentication processing, the threshold setting processing is performed in which the authentication results close in time to the present timing are emphasized. For example, where the portable information terminal 10 is used in an environment with a low level of illumination, a low similarity is calculated. Where it is assumed that the operating environment does not change over a short period of time, the threshold setting reflecting the operating environment at the present time can be performed by setting the threshold with an emphasis on the most recent results.

The description of the embodiment hereinabove is merely intended to illustrate the present invention, and the present invention is not limited to the above-described specific embodiment. Thus, the present invention can be variously changed without departing from the technical concept thereof.

VARIATION EXAMPLE 1

In the description hereinabove, the threshold is determined in the authentication threshold update processing S208 such that the false rejection rate and the false acceptance rate become equal to each other, but the threshold may be also set according to other criteria. For example, the threshold may be determined such that the false rejection rate has (is equal to or lower than) a certain predetermined value, or the threshold may be determined such that the false acceptance rate has (is equal to or lower than) a certain predetermined value. When there is no a threshold such that the false rejection rate or false acceptance rate takes the above-mentioned predetermined value, the threshold may be set such that the false rejection rate or false acceptance rate takes a value close to the predetermined value, and a maximum value at which the false rejection rate is equal to or lower than the predetermined value may be taken as the threshold, or the minimum value at which the false acceptance rate is equal to or lower than the predetermined value may be taken as the threshold. Thus, in the authentication threshold update processing S208, when the authentication result data stored in the authentication result data storage unit 106 are used, the threshold may be determined such that at least either one of the false rejection rate or false acceptance rate fulfils a predetermined condition. The determination criteria of the threshold may be determined by applying the face authentication processing.

Figure 5:
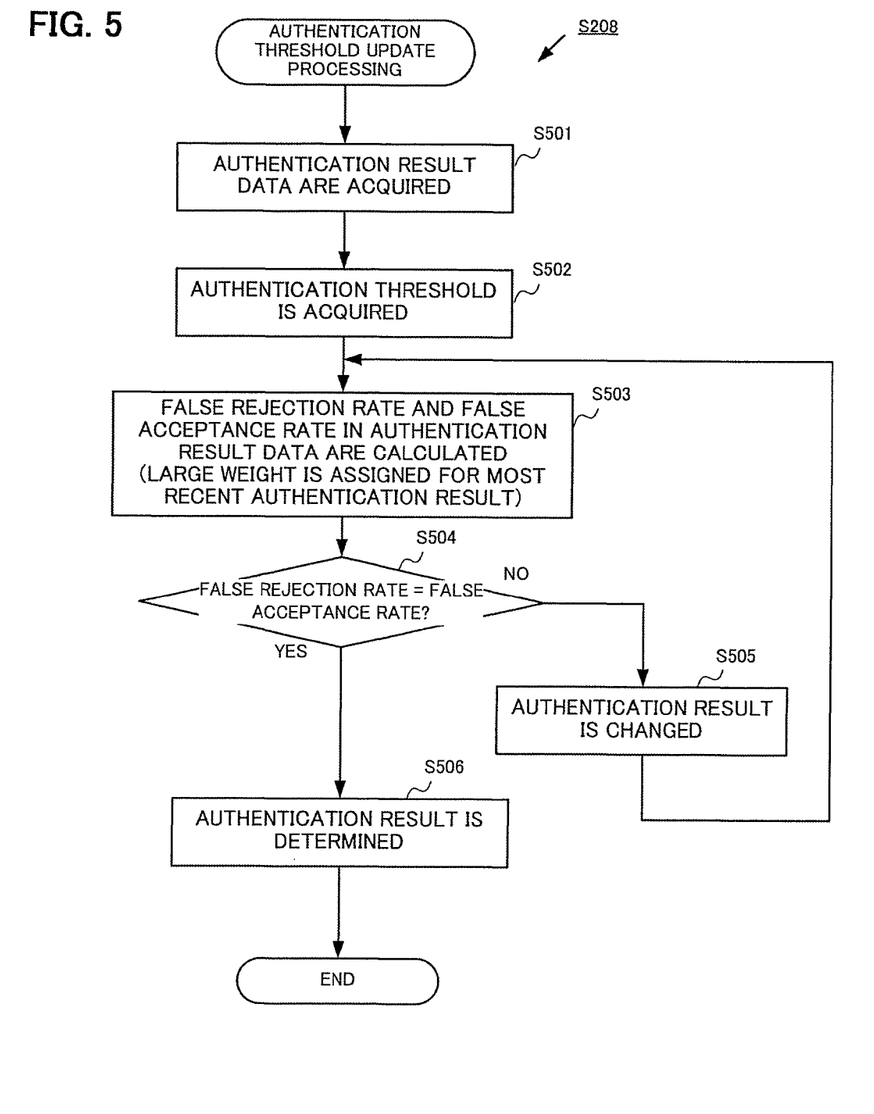
FIG. 5 is a flowchart illustrating the flow of authentication threshold update processing in the embodiment.

In the description above, in the authentication threshold update processing S208, the adequate authentication threshold is determined exploratory as indicated in the flowchart in FIG. 5, but the adequate threshold may be also determined by a brute force method. Namely, it is possible to determine the false rejection rate or false acceptance rate by using various values as a threshold and then determine a threshold such that the results obtained satisfy the predetermined condition (for example, the false rejection rate and the false acceptance rate are equal to each other). Further, for certain data stored in the authentication result data storage unit 106, the predetermined condition can be satisfied when the threshold takes a value within a certain range. In this case, the threshold may be determined as a value within this range, but a value close to the center (average of the upper limit value and lower limit value) of the range is preferred, and the center of the range is most preferred. Conversely, in some cases, there is no threshold satisfying the predetermined condition. In such cases, the threshold may be determined close to the predetermined condition. For example, the threshold may be determined such that the difference between the false rejection rate and false acceptance rate is at a minimum. Alternatively, it is possible to determine approximation curves of the false rejection rate or false acceptance rate found from the authentication result data and use the threshold corresponding to the crossing point of the approximation curves.

VARIATION EXAMPLE 2

In the description above, in the authentication threshold update processing S208, the threshold is determined by assigning a weight to the authentication result data, but the threshold may be also determined without weighting. In this case, the threshold setting unit 107 preferably determines the threshold by using the authentication result data relating to a predetermined number of authentications that have been most recently performed, or the authentication result data relating to the authentication performed within a most recent predetermined period.

VARIATION EXAMPLE 3

The description above presumes that there is only one registrant, but the threshold can be also adequately set in the same manner as described hereinabove when there is a plurality of registrants. Initially, the face authentication processing is described.

When face authentication is performed without designating the number of authentication subjects (1-to-N match), the face authentication unit 102 calculates the similarity between the input face image and the face images of all of the registrants which have been registered, determines the registrant for which the similarity is equal to or greater than the authentication threshold (in the case of a plurality of such registrants, the registrant with the highest similarity), and indicates that the authentication is successful. In this case, the similarity and correct authentication result (whether or not the registrant is the person himself) are obtained with respect to each registrant, and therefore all of those data are stored as the authentication result data in the authentication result data storage unit 106. The registrants, for whom the similarity is equal to or higher than the threshold, but is not the maximum value, can be determined as persons other than the authentication subject.

Meanwhile, when the authentication subject performs face authentication by inputting a user ID or the like and designating the registrant that he or she is (1-to-1 match), the matching of face images may be performed with the designated registrant for the purpose of authentication, but the face authentication unit 102 calculates the similarity of face images also with the non-designated registrants for threshold update processing. Therefore, with respect to the registrant designated by the authentication subject, the determination as to whether the registrant is the authentication subject may be performed in the same manner as descried hereinabove. All of the registrants other than the registrant designated by the authentication subject may be determined to be different from the authentication subject.

When there is a plurality of registrants, an authentication threshold may be set individually for each of the plurality of registrants, or a common authentication threshold may be set for all of the registrants. When a threshold is set for each registrant, in the threshold update processing, the threshold is updated by using only the authentication result data (similarity and correct authentication result) obtained when comparing with each registrant. For example, when the threshold relating to a registrant A is updated, it is possible to determine a false rejection rate curve from the authentication result with a correct answer of "PERSON HIMSELF" and determine a false acceptance rate curve from the authentication threshold with a correct answer of "OTHER PERSON" on the basis of the similarity and correct answer obtained when comparing the subject with the registrant A, and to set a threshold for the registrant A such that the false rejection rate or false acceptance rate satisfies the predetermined condition. In this case, it is preferred that the authentication result data also include an identifier that indicates a registrant who is a matching object in addition to the authentication date and time 401, similarity 402, and correct identification result 403 depicted in FIG. 4A. Meanwhile, where a common threshold is set for all of the registrants, the threshold may be updated using all of the authentication result data. More specifically, it is possible to determine a false rejection rate curve from the authentication result with a correct answer of "PERSON HIMSELF" and determine a false acceptance rate curve from the authentication threshold with a correct answer of "OTHER PERSON", regardless of the registrant who is a comparison object, and to set a common threshold for all of the registrants such that the false rejection rate or false acceptance rate satisfies the predetermined condition.

Thus, the effect same as described hereinabove can be also obtained when there is a plurality of the registrants. A large number of results can be obtained by performing matching with all of the registrants and the adequate threshold can be set on the basis thereof.

VARIATION EXAMPLE 4

Figure 6A:
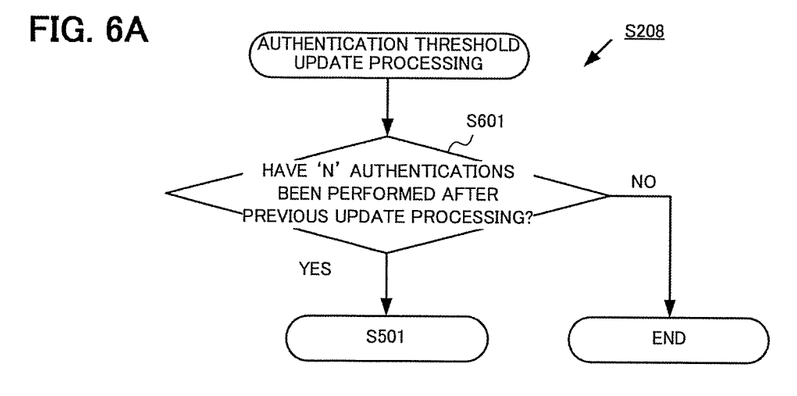
FIGS. 6A and 6B are flowcharts illustrating the variation example of the authentication threshold update processing.

In the description hereinabove, it is assumed that the threshold update processing is performed each time the authentication processing is performed anew. However, the timing for performing the threshold update processing can be other than that described hereinabove. For example, it is possible to determine whether or not the authentication processing has been performed a predetermined number of times after the previous threshold update processing (S601), as depicted in FIG. 6A, and execute the threshold update processing of step S501 (FIG. 5) and subsequent steps only when the authentication processing has been performed the predetermined number of times. As a result, the load relating to the threshold update processing can be reduced.

Figure 6B:
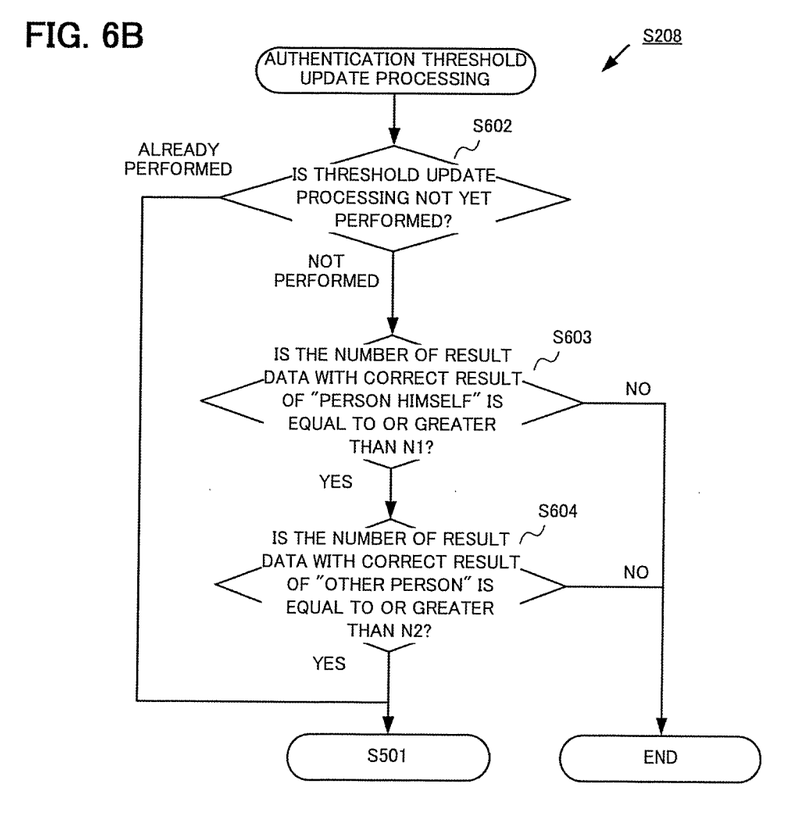

The abovementioned predetermined number of times may be a fixed value or may be determined according to the similarity calculated in the authentication processing. For example, the value of the predetermined number of times may be reduced as the spread (variance) in the calculated similarity increases. In particular, the value of the predetermined number of times may be reduced as the spread (variation in the value) in the recently calculated similarity increases. This is apparently because where the similarity spreads, it is highly probable that the photographing conditions, or the like, are different from those at the time of registration and it is highly necessary to change the threshold.

Where the threshold update processing is performed on the basis of a small number of data, an adequate threshold sometimes cannot be set. Accordingly, it is preferred that the threshold update processing be not performed until the predetermined number of identification result data is accumulated after the system has been activated. For example, when the threshold update processing is not performed after the system has been activated (S602-YES), as depicted in FIG. 6B, the threshold update processing may be performed for the first time when the number of the accumulated authentication result data with the correct identification result 403 of "PERSON HIMSELF" is equal to or greater than N1 (S603-YES) and when the number of the accumulated authentication result data with the correct identification result 403 of "OTHER PERSON" is equal to or greater than N2 (S604-YES). In this case, the aforementioned N1 and N2 may be the same number or different numbers. Where both the false rejection rate and false acceptance rate are referred to, for example, when the threshold is set such that the false rejection rate and false acceptance rate become equal to each other, it is desirable that both N1 and N2 have certain large values. Meanwhile, when the threshold is set with reference only to the false rejection rate, N1 may be a large value and N2 may be zero (that is, no condition is set for N2). Further, when the threshold is set with reference only to the false acceptance rate, N2 may be a large value and N1 may be zero (that is, no condition is set for N1). The condition which is set herein is that the number of the result data with the correct answer of "PERSON HIMSELF" and the number of the result data with the correct answer of "OTHER PERSON" be equal to or greater than the respective predetermined numbers, but the number of all of the result data being equal to or greater than a predetermined number may be also set as the condition for executing the threshold setting processing.

Where the threshold update processing has been performed even once after the system was activated (S602-YES), the threshold update processing may be performed for each authentication processing, as depicted in FIG. 6B, or the threshold update processing may be performed, as described hereinabove, each time the authentication processing is performed a predetermined number of times after the previous threshold update processing.

VARIATION EXAMPLE 5

In the description hereinabove, an example is described in which individual identification based on a face image is used for login authentication to a portable information terminal, but this is merely an example of possible application. The face authentication processing can be also used with other systems such as a system that manages entrance to a building or room and departure therefrom. Further, the individual identification based on the face image is not limited to authentication purposes and can be also used in an image management device that stores a plurality of image data and automatically identifies (determines) who is the person included in the image. In the image management device, it is possible to present the face image identification result to the user and receive an input as to whether the identification result is correct, or receive an input of the correct result when the identification result is erroneous. In the image management device, the correct identification result can be also acquired on the basis of such input.

Subject identification (individual identification), as referred to herein, is the processing of determining whether or not the subject matches the registrant, such processing including both the 1-to-1 matching and the 1-to-N matching. Individual identification can be applied to the authentication processing, and where the subject is the registrant, the validity of the subject can be confirmed. The authentication processing includes the identification processing, and the terms of authentication threshold and authentication results in the description hereinabove can be regarded to be inclusive of the identification threshold and identification results.

VARIATION EXAMPLE 6

In the description hereinabove, the device determines the correct identification result. However, the correct identification result may be also provided by a human. For example, the individual identification device stores the input image, the registrant as a comparison object, similarity, and the correct identification result determined by the device in the identification processing, and presents those types of information to the user or administrator at any timing after the identification processing to check whether the correct identification result is adequate. When the user or administrator have obtained the input that the correct identification result determined by the device is wrong, it is preferred that the correct identification result be changed and the calculation of the false rejection rate and false acceptance rate, which are based on the changed authentication result data, and the processing of updating the identification threshold be executed again.

VARIATION EXAMPLE 7

In the description hereinabove, the false rejection rate or false acceptance rate is determined by using the authentication result (identification result) of the processing such as login authentication. However, it is also possible to perform matching between the registrants, determine the false rejection rate or false acceptance rate on the basis of the result, and update the identification threshold therefrom.

For example, an image management device accepts from the user the designation (tagging) as to whether a face in the image is somebody's face. Thus, since the image management device accepts from the user the indication as to whether the face image is the copy of somebody's face, people with those face images can be considered as registrants. The identification with the correct identification result being "PERSON HIMSELF" is performed by matching the tagged face images of the same person. Thus, when the matching fails (when the similarity is less than the identification threshold), it can be determined that a false rejection has occurred. Further, the identification with the correct identification result being "OTHER PERSON" is performed by matching the tagged face images of different people. Thus, when the matching is successful (when the similarity is equal to or greater than the identification threshold), it can be determined that false acceptance has occurred. The results obtained in such matching of the images of the registrants are stored as identification result data, and it is also preferred that the identification threshold be updated using those identification result data.

The above-described processing is not specific to the image management device and is generally applicable to an identification device that stores face images of a plurality of registrants.

VARIATION EXAMPLE 8

In the description hereinabove, an example is explained in which individual identification is performed using a face image, but the above-described threshold setting can be also used in identification processing using biometric information other than the face image. Examples of the biometric information other than the face image include physical characteristics (static characteristics) such as fingerprints, palm print, iris, voice print, and blood vessels, and behavioral characteristics such as handwriting, key stroke, blinking, lip movement, and walking pattern.

What is claimed is:

1. An individual identification device comprising:
   a storage device comprising:
   a biometric information storage unit configured to store biometric information on a registrant; and
   a processor comprising:
   a biometric information acquisition unit configured to acquire biometric information on a subject;
   an identification unit configured to calculate a similarity of the biometric information on the subject and the biometric information on the registrant and perform identification of the subject according to whether or not the calculated similarity is equal to or higher than an identification threshold;
   a second identification unit configured to acquire a result of identification of the subject based on information different from the information used in the identification unit, wherein the second identification unit acquires the result of identification of the subject when the identification performed by the identification unit indicates that the subject is not the registrant,
   wherein the individual identification device is configured to determine that the identification has failed when the result of identification acquired by the second identification unit indicates that the subject is not the registrant, and to determine that the identification has been successful when the identification performed by the identification unit or the result of identification acquired by the second identification unit indicates that the subject is the registrant;

an identification result storage unit configured to store identification result information constituted by the similarity calculated by the identification unit and a correct identification result in the identification performed by the identification unit or acquired by the second identification unit, the correct identification result indicating that the subject is the registrant: and a threshold setting unit configured to set the identification threshold such that at least either one of a false rejection rate and a false acceptance rate fulfills a predetermined condition in the identification result information stored in the identification result storage unit, wherein the threshold setting unit sets the identification threshold by assigning a weight, wherein the weight is larger for identification result information relating to an identification performed at a most recent time, and wherein the weight is smaller for identification result information relating to an identification that has been performed at a time prior to the most recent time.

2. The individual identification device according to claim 1, wherein the threshold setting unit sets the identification threshold by using identification result information relating to a predetermined number of most recent identifications or identification performed in a most recent predetermined period.

3. The individual identification device according to claim 1, wherein the predetermined condition is that the false rejection rate and false acceptance rate are substantially equal to each other.

4. The individual identification device according to claim 1, wherein the predetermined condition is that the false rejection rate is equal to or less than a first threshold.

5. The individual identification device according to claim 1, wherein the predetermined condition is that the false acceptance rate is equal to or less than a second threshold.

6. The individual identification device according to claim 1, wherein the threshold setting unit sets the identification threshold each time the identification is perfoiined by the identification unit.

7. The individual identification device according to claim 1, wherein the threshold setting unit sets the identification threshold each time the identification unit performs the identification a predetermined number of times after the previous identification threshold setting has been performed.

8. The individual identification device according to claim 7, wherein the predetermined number of times is variable and determined to be smaller as a variation in a value of the similarity calculated by the identification unit becomes larger.

9. The individual identification device according to claim 1, wherein the threshold setting unit does not set the identification threshold until the number of pieces of the identification result information accumulated in the identification result storage unit becomes a third threshold or higher.

10. The individual identification device according to claim 9, wherein the threshold setting unit does not set the identification threshold until the number of pieces of identification result information which are accumulated in the identification result storage unit and in which the subject is the registrant becomes a fourth threshold or higher and the number of pieces of identification result information which are accumulated in the identification result storage unit and in which the subject is not the registrant becomes a fifth threshold or higher.

11. The individual identification device according to claim 1, wherein biometric information on a plurality of registrants is stored in the biometric information storage unit, and the identification threshold is set individually for each of the plurality of registrants.

12. The individual identification device according to claim 1, wherein the biometric information is a face.

13. An identification threshold setting method for use in an individual identification device that includes a storage device comprising: a biometric information storage unit configured to store biometric information on a registrant; and a processor comprising: a biometric information acquisition unit configured to acquire biometric information on a subject; an identification unit configured to calculate a similarity of the biometric information on the subject and the biometric information on the registrant and perform identification of the subject according to whether or not the calculated similarity is equal to or higher than an identification threshold; and a second identification unit configured to acquire a result of identification of the subject based on information different from the information used in the identification unit, wherein the second identification unit acquires the result of identification of the subject when the identification performed by the identification unit indicates that the subject is not the registrant, the method comprising:

a first determination step of determining by the individual identification device that the identification has failed when the result of identification acquired by the second identification unit indicates that the subject is not the registrant;

a second determination step of determining by the individual identification device that the identification has been successful when the identification performed by the identification unit or the result of identification acquired by the second identification unit indicates that the subject is the registrant;

an identification result storage step of storing identification result information constituted by the similarity calculated by the identification unit and a correct identification result in the identification performed by the identification unit or acquired by the second identification unit, the correct identification result indicating that the subject is the registrant; and a threshold setting step of setting the identification threshold such that at least either one of a false rejection rate and a false acceptance rate fulfills a predetermined condition in the identification result information stored in the identification result storage step, wherein the threshold setting unit sets the identification threshold by assigning a weight, wherein the weight is larger for identification result information relating to an identification performed at a most recent time, and wherein the weight is smaller for identification result information relating to an identification that has been performed at a time prior to the most recent time.

14. A non-transitory computer-readable medium storing program for setting an identification threshold which is to be used in an individual identification device that includes a storage device comprising: a biometric information storage unit configured to store biometric information on a registrant; and a processor comprising: a biometric information acquisition unit configured to acquire biometric information on a subject; an identification unit configured to calculate a similarity of the biometric information on the subject and the biometric information on the registrant and perform identification of the subject according to whether or not the calculated similarity is equal to or higher than an identification threshold; and a second identification unit configured to acquire a result of identification of the subject based on information different from the information used in the identification unit, wherein the second identification unit acquires the result of identification of the subject when the identification performed by the identification unit indicates that the subject is not the registrant, the program causing a computer to execute:

a first determination step of determining by the individual identification device that the identification has failed when the result of identification acquired by the second identification unit indicates that the subject is not the registrant;

a second determination step of determining by the individual identification device that the identification has been successful when the identification performed by the identification unit or the result of identification acquired by the second identification unit indicates that the subject is the registrant:

an identification result storage step of storing identification result information constituted by the similarity calculated by the identification unit and a correct identification result in the identification performed by the identification unit or acquired by the second identification unit, the correct identification result indicating that the subject is the registrant; and a threshold setting step of setting the identification threshold such that at least either one of a false rejection rate and a false acceptance rate fulfills a predetermined condition in the identification result information stored in the identification result storage step, wherein the threshold setting unit sets the identification threshold by assigning a weight, wherein the weight is larger for identification result information relating to an identification performed at a most recent time, and wherein the weight is smaller for identification result information relating to an identification that has been performed at a time prior to the most recent time.

15. The individual identification device according to claim 1, wherein the threshold setting unit sets a subsequent identification threshold when the identification unit performs the identification a predetermined number of times after the threshold setting unit sets a previous identification threshold, and wherein the predetermined number of times is variable.

16. The identification threshold setting method according to claim 13, further comprising a subsequent threshold setting step of setting a subsequent identification threshold when the identification unit performs the identification a predetermined number of times after a previous identification threshold setting has been performed, and wherein the predetermined number of times is variable.

17. The non-transitory computer-readable medium storing the program for setting the identification threshold according to claim 14, the program causing the computer to further execute: a subsequent threshold setting step of setting a subsequent identification threshold when the identification unit performs the identification a predetermined number of times after a previous identification threshold setting has been perfoiiiied, and wherein the predetermined number of times is variable.

* * * * *

UNITED STATES PATENT AND TRADEMARK OFFICE
CERTIFICATE OF CORRECTION

PATENT NO. : 9,875,425 B2
APPLICATION NO. : 14/928086
DATED : January 23, 2018
INVENTOR(S) : Atsushi Irie et al.

It is certified that error appears in the above-identified patent and that said Letters Patent is hereby corrected as shown below:

In the Claims

At Column 15, Claim number 6, Line number 47, the word "perfoiined" should read --performed--; and At Column 18, Claim number 17, Line number 32, the word "perfoiiiied" should read --performed--.

Signed and Sealed this
First Day of May, 2018

Andrei Iancu
*Director of the United States Patent and Trademark Office*